United States Patent [19]

Maass

[11] Patent Number: 4,499,779

[45] Date of Patent: Feb. 19, 1985

[54] VIBRATORY COMPACTOR

[75] Inventor: Helmut Maass, West Bend, Wis.

[73] Assignee: M-B-W Inc., Slinger, Wis.

[21] Appl. No.: 385,527

[22] Filed: Jun. 7, 1982

[51] Int. Cl.³ .............................................. F16H 33/20

[52] U.S. Cl. ........................................ 74/61; 404/113; 404/133

[58] Field of Search ...................... 74/61, 87; 404/113, 404/117, 121, 133; 173/49

[56] References Cited

U.S. PATENT DOCUMENTS

| | | | |
|---|---|---|---|
| 3,396,805 | 8/1968 | Muller | 173/49 |
| 3,419,313 | 12/1968 | Ulusal | 74/61 X |
| 3,505,885 | 4/1970 | Waschulewski et al. | 74/61 |
| 3,625,074 | 12/1971 | Waschulewski et al. | 74/61 |
| 3,722,380 | 3/1973 | Kaltenegger | 404/117 |
| 3,832,080 | 8/1974 | Stoecker | 404/133 |
| 3,878,733 | 4/1975 | Tertinek | 74/61 |
| 4,113,034 | 9/1978 | Carlson | 173/49 |
| 4,356,736 | 11/1982 | Riedl | 74/61 |
| 4,389,137 | 6/1983 | Riedl | 404/113 |

FOREIGN PATENT DOCUMENTS

| | | | |
|---|---|---|---|
| 1232382 | 1/1967 | Fed. Rep. of Germany | 404/113 |

*Primary Examiner*—Leslie A. Braun
*Assistant Examiner*—Dwight G. Diehl
*Attorney, Agent, or Firm*—Andrus, Sceales, Starke & Sawall

[57] ABSTRACT

A vibratory compactor having forward and reverse movement. The compactor comprises a bottom plate and a pair of standard, single shaft, vibration generating units are mounted in side-by-side relation on the bottom plate and each unit includes an eccentric shaft. The eccentric weight of one of the shafts can be varied in angular position with respect to the weight of the other shaft to provide both forward and reverse movement for the compactor. To adjust the angular position of one of the eccentric shafts, an axially slidable collar is splined to the eccentric shaft and a drive lug on the collar can be selectively engaged with a drive element on a drive gear or with a drive element on a ring which is fixed to the gear and spaced axially therefrom. The drive elements on the gear and the ring are displaced 180°. By moving the collar axially through a manual control, the drive lug will be disengaged with the drive element on the gear and will be engaged with the drive element on the ring. During this adjustment, the gear will advance 180° ahead of the eccentric shaft, thereby changing the angular position of the eccentric shaft with respect to the constantly rotating eccentric shaft to provide a reverse movement for the compactor.

5 Claims, 5 Drawing Figures

VIBRATORY COMPACTOR

BACKGROUND OF THE INVENTION

Conventional single direction vibratory compactors used for compacting soil, or the like, include a vibrating bottom plate, and a vibration generating unit, consisting of an eccentric shaft carrying an unbalanced weight, is operably connected to the plate. The vibration generating unit generates forces having both vertical and horizontal components which tend to move the plate in a forward direction. Under certain compacting conditions, it may be desirable to move the compactor in both forward and reverse directions, as for example, when the compactor is being used in areas of limited maneuverability.

Many constructions have been proposed in the past to provide reversible drive for compactors. Some systems require the compactor be brought to a full stop in order to reverse directions. Other systems employ a pair of parallel eccentric shafts which rotate in opposite directions with each shaft having an unbalanced weight. By adjusting the angular relation between the eccentric weights on the shafts, the amplitude and/or direction of the vibratory forces can be varied to provide both forward and reverse moment. For example, U.S. Pat. No. 3,262,329 discloses a mechanism for changing the direction of movement of the compactor which is equipped with a pair of eccentric shafts. As disclosed in that patent, a shifting ring is keyed to the eccentric shaft and in its normal position, lugs on the shifting ring will engage lugs on the input gear to thereby provide a driving connection between the gear and the eccentric shaft. By manually moving the shifting ring axially with respect to the eccentric shaft through use of a manual control, driving lugs on the opposite side of the shifting ring will engage an inclined cam which is designed such that after the drive gear has advanced 180° ahead of the eccentric shaft, the lugs will slide off the cam which will enable the lugs on the shifting ring to re-engage the lugs on the drive gear to reinstate the driving connection between the drive gear and the eccentric shaft. With this construction, as shown in the above-mentioned patent, the eccentric shaft thus is lagged 180° behind the other eccentric shaft so that a phase displacement of 180° is obtained which will result in reverse movement of the compactor.

SUMMARY OF THE INVENTION

The invention is directed to an improved vibratory compactor having both forward and reverse movement. In accordance with the invention, the compactor includes a pair of standard single-shaft vibration generating units, which are mounted in side-by side relation on the base plate. Each generating unit includes an eccentric shaft and the eccentric weight of one of the shafts can be varied in angular position with respect to the weight of the other of the shafts to provide both forward and reverse movement for the compactor.

To adjust the angular position of the eccentric shaft, an axially slidable shift collar is splined to the eccentric shaft, and a drive lug on the collar can be selectively engaged with a drive element on a drive gear, or with a drive element on a ring which is fixed to the gear and spaced axially from the gear. The drive element on the gear is displaced 180° from the drive element on the ring.

By moving the shift collar axially through manual controls, the drive lug on the collar will be disengaged from the drive element on the gear and will be engaged with the drive element on the ring. During this adjustment, the gear will advance 180° ahead of the eccentric shaft, so that the eccentric shaft has lagged 180° behind the other eccentric shaft, to which the driving force is continually applied, so that a phase displacement of 180° is obtained between the eccentric weights and thus reverse movement for the compactor is obtained.

Both forward and reverse drive are provided in the compactor of the invention through use of two standard single shaft vibratory units, as opposed to utilizing a specially designed twin eccentric system. As standard vibratory units are utilized, the overall cost of the mechanism is substantially reduced over other reversing mechanisms, as on the market.

The shift mechanism, which is normally the mechanism which will require repair or maintenance, is located in a gear casing on the outside of the vibration generating units. Thus, the shift mechanism is readily accessible by merely removing the gear box cover and it is not necessary to disassemble the generating units to repair the shift mechanism, as is required in prior art systems.

Other objects and advantages will appear in the course of the following description.

DESCRIPTION OF THE DRAWINGS

The drawings illustrate the best mode presently contemplated of carrying out the invention.

In the drawings.

Description of the Illustrated Embodiment

Figures 1, 5:
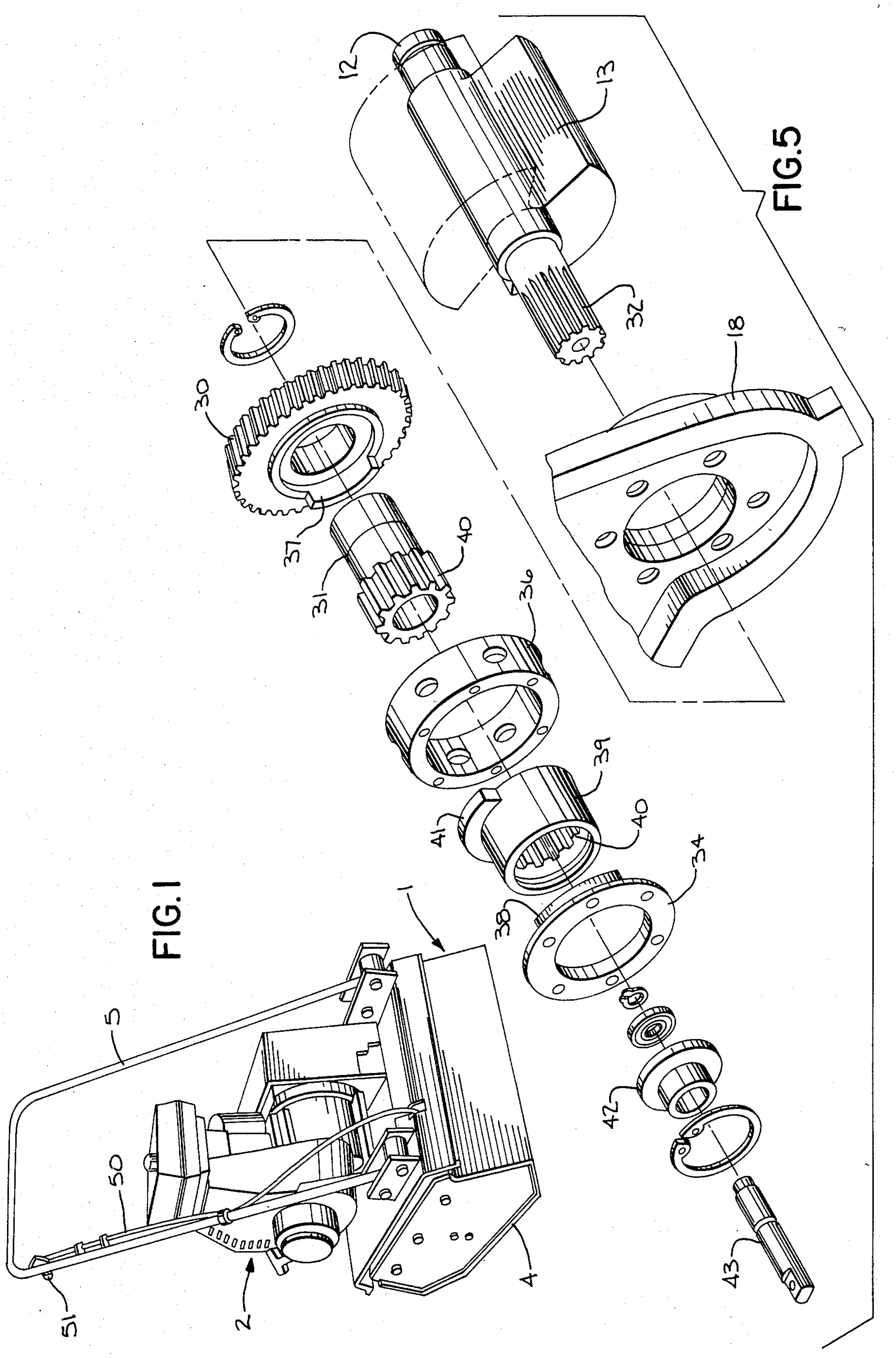
FIG. 1 is a perspective view of a vibratory compactor utilizing the invention.
FIG. 5 is an exploded perspective view of the shifting mechanism.

FIG. 1 illustrates a vibratory compactor which comprises a base 1 and an internal combustion engine 2 is mounted on the base and serves to drive a vibration generating mechanism 3 that provides vibratory motion for the bottom plate 4 of base 1. A pivotable handle 5 extends upwardly from the base 1 and is adpated to be grasped by the operator in moving the compactor over the ground.

Figure 3:
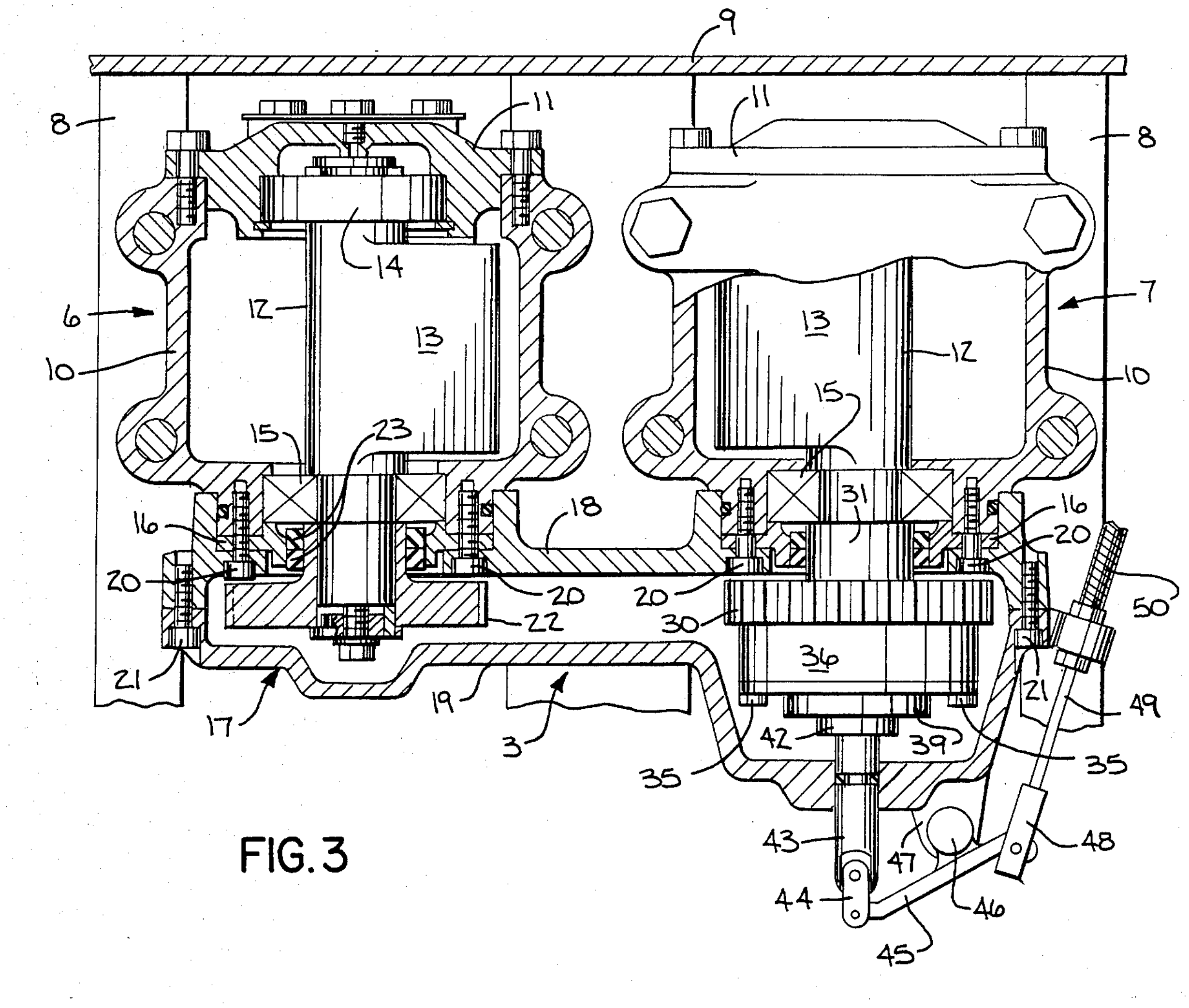
FIG. 3 is a horizontal section taken along line 3—3 of FIG. 2.

The vibration generating mechanism 3 is best illustrated in FIG. 3 and includes a pair of standard single shaft vibration generating units 6 and 7 which are mounted in side-by-side relation in the base 1. The units 6 and 7 are bolted to the cross bars 8 which are welded to base plate 4 and extend transversely across the base unit between the side walls 9.

Each of the generating units 6 and 7 includes a generally cylindrical housing 10 and one end of the housing is enclosed by an end head 11. A shaft 12 which carries an off-set or unbalanced weight 13 is journalled within the end head 11 and within the housing 10 by bearing assemblies 14 and 15, respectively. Cover 16 encloses the opposite end of each housing 10 and is provided with a central opening through which the end of the shaft 12 projects.

As shown in FIG. 3 a gear casing 17 is mounted to the ends of the housings 10 of the generating units 6 and 7. Gear casing 17 includes an inner section 18 and an outer cover section 19. The inner section 18 is connected to the ends of the housings 10 by bolts 20, while outer section 19 is connected to the inner section through bolts 21.

A gear 22 is connected by a spline connection to the outer end of the shaft 12 of generating unit 6 and as gear casing 17 is normally filled with a lubricant, such as oil, seals 23 seal off the space between the hub portion of gear 22 and the cover 16.

Gear 22, and the corresponding eccentric shaft 12, is driven by a gear 24 located within gear casing 17. The shaft 25 of gear 24 is suitably journalled in sections 18 and 19 of the casing and the outer end of shaft 25 projects outwardly of casing 17 and carries a pulley 26 which is connected by belt 27 to the drive shaft of the engine 2.

Figure 2:
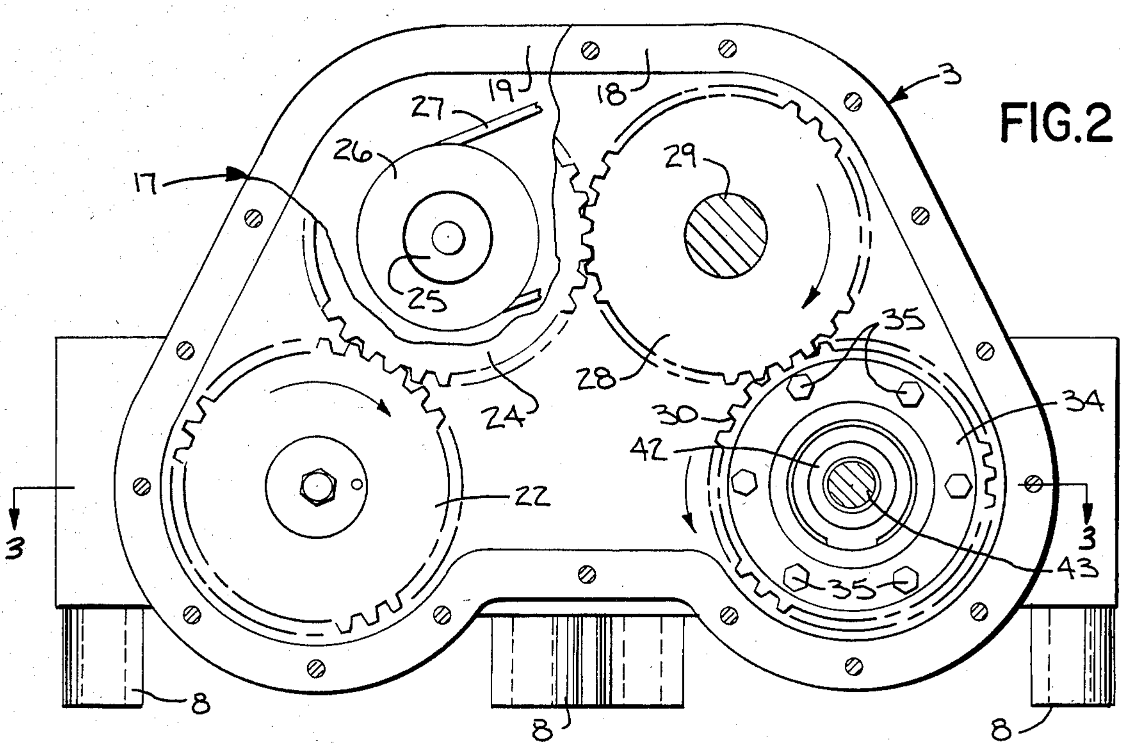
FIG. 2 is a side elevation of the gear case with gear case cover removed.

As shown in FIG. 2, gear 24 also drives idler gear 28, and the idler gear 28 is carried by shaft 29 that is journalled within the gear box sections 18 and 19. Idler gear 28, in turn drives gear 30. As shown in FIG. 2, the gears 22 and 30 are driven in opposite directions by this gear train.

Figure 4:
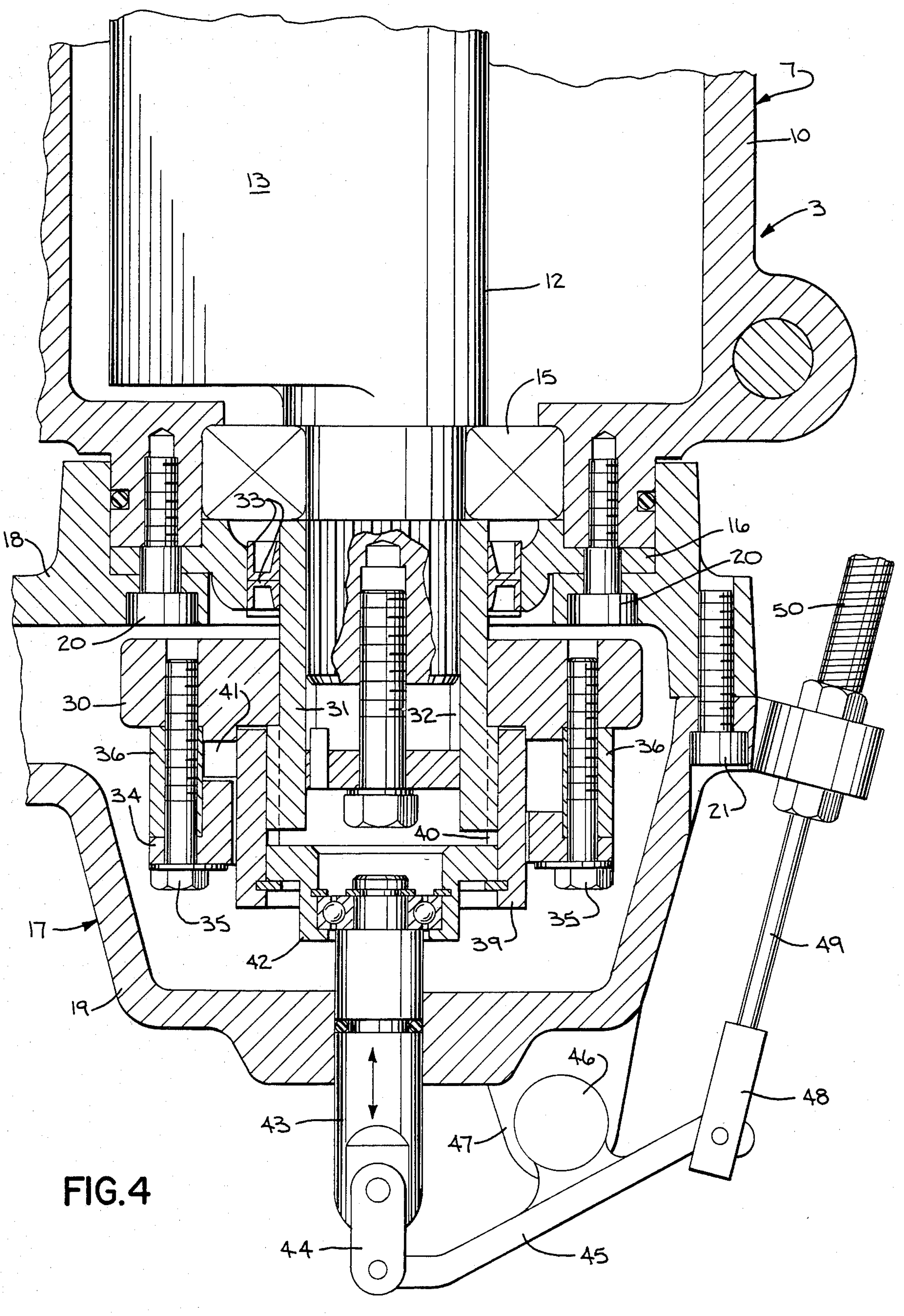
FIG. 4 is an enlarged fragmentary horizontal section showing the shifting mechanism.

As shown in FIG. 4, gear 30 is mounted for rotation about a sleeve 31 which is connected to the outer end of shaft 12 of generating unit 7 by a spline connection, indicated by 32. Seals 33 are located between the outer surface of sleeve 31 and cover 16 to prevent leakage of lubricant from the interior of gear casing 17.

Connected to gear 30 is a ring 34. As shown in FIG. 4, ring 34 is located axially outward of gear 30 and is connected to the gear through bolts 35. Bolts 35 extend through spacer 36 which serve to maintain the proper axial spacing between gear 30 and ring 34. With this construction, rotation of gear 30 will cause corresponding rotation of ring 34. As best shown in FIG. 5, the gear 30 is provided with an arcuate drive element or lug 37, and ring 34 is similarly provided with a drive lug 38. Lug 37 is displaced 180° from lug 38, as best illustrated in FIG. 5. Lugs 37 and 38 each extend through an arc of approximately 80°.

In order to adjust the angular position of the shaft 12 of generating unit 7 with respect to shaft 12 of generating unit 6, a shift mechanism is incorporated. The shift mechanism includes a shift collar 39 which is connected to the outer end of sleeve 31 through spline connection 40. With this connection the shift collar 39 can move axially relative to sleeve 31 but rotation transmitted to shift collar 39 will be transmitted through sleeve 31 to shaft 12.

As best shown in FIG. 4, the inner end of shift collar 39 is provided with a drive element or lug 41 which is selectively engageable with the lug 37 on gear 30, or the lug 38 on ring 34. Lug 41 extends through an arc of about 80°.

In order to move collar 39 axially, an operating mechanism is connected to the collar which is actuated through manual controls. More particularly, cap 42 is secured to the outer portion of collar 39, as shown in FIG. 4, and the inner end of a shift rod 43 is connected to cap 42. Chain link 44 connects the outer end of shift rod 43 with one end of arm 45 which is pivotally connected to boss 46 formed on extension 47 of gear casing 17. The opposite end of arm 45 is pivotally connected to clevis 48 and the clevis carries a rod 49, which, in turn, is connected to a flexible shaft cable 50, which extends upwardly through base 1 and terminates in a pull knob 51 on handle 5. By moving the pull knob 51 in a reciprocating manner, the shift cable 50 will operate through arm 45 and rod 43 to move shift collar 39 in a reciprocating manner to selectively engage the lug 41 on collar 39 with either the lug 37 on gear 30, or lug 38 on ring 34.

In operation of the compactor, if the weights 13 on shafts 12 are in the same relative angular position, the compactor will move in a forward direction over the ground. If it is desired to reverse the direction of movement, the operator pulls on the cable 50 moving the shift collar 39 outwardly and disengaging lug 41 from lug 37 on gear 30, and the lug 41 will then fall into engagement with the lug 38 on ring 34. During this shifting movement, the gear 30, as well as gear 22 which is connected to shaft 12 of generating unit 6, will advance with respect to the shaft 12 of generating unit 7, thereby causing the eccentric shaft of generating unit 7 to lag 180° behind the other eccentric shaft, so that a phase displacement of 180° of weights 13 is obtained. As a result, vibrating plate 4 will be moved in the opposite direction.

The invention provides both forward and reverse drive through use of two standard, single eccentric shaft vibrating units, as opposed to utilizing a specially designed twin eccentric system. By using the standard vibrating units a substantial reduction in overall cost is achieved.

As a further advantage, the shifting mechanism is located entirely within the gear case 17 and if it is necessary to repair the shift mechanism, this can be readily accomplished by merely removing the outer cover or section 19 of the gear casing which renders the entire shifting mechanism accessible. This greatly simplifies maintenance and repair over conventional units, which require the entire generating units to be disassembled in order to replace the shift mechanism.

Various modes of carrying out the invention are contemplated as being within the scope of the following claims particularly pointing out and distinctly claiming the subject which is regarded as the invention.

I claim:

1. In a vibration generating mechanism, a lease, a vibrating member, a pair of vibration generating units connected to the vibrating member and disposed in side-by-side relation in said base, each unit having an enclosed fixed housing and having an eccentric shaft journalled within the housing, said eccentric shafts being generally parallel and corresponding ends of said shafts projecting from the respective housings, gear train means operably connecting a power source to the projecting ends of said shafts to rotate said shafts in opposite directions, said gear train means including a pair of first gears connected to the projecting ends of the respective shafts and a pair of second gears interconnecting said first gears, a gear casing connected to said housing and containing said gear train means, a shift mechanism disposed within the gear casing and outside said fixed housings and operable to effect angular displacement of a first of said shafts relative to the other of said shafts to thereby provide an adjustment in the angularity of forces generated and reverse movement for said vibrating member, and operating means connected to the shift mechanism and disposed on the outside of said gear casing for manually operating said shift mechanism.

2. The mechanism of claim 1, wherein said gear means comprises a gear journaled about the projecting end of said first shaft and having a first driving element, a ring spaced axially from said gear and fixed to said gear and having a second driving element, and a shift member rotatably connected to said first shaft and axially movable relative to said first shaft, said shift member having a lug selectively engageable with said first and second drive elements, said operating means being connected to said shift member to move said shift member axially of said shaft and provide selective engagement of said lug with said driving elements.

3. The mechanism of claim 2, wherein the first driving element is displaced in a circumferential direction of said second driving element.

4. The mechanism of claim 3, wherein said first driving element is displaced approximately 180° from said second driving element.

5. The mechanism of claim 2, wherein said operating means comprises a rod extending through an opening in said gear casing and operably connected to said shift member.

* * * * *

UNITED STATES PATENT AND TRADEMARK OFFICE
CERTIFICATE OF CORRECTION

PATENT NO. : 4,499,779

DATED : February 19, 1985

INVENTOR(S) : HELMUT MAASS

It is certified that error appears in the above-identified patent and that said Letters Patent is hereby corrected as shown below:

Col. 4, Line 41, After "subject" insert ---matter---; Col. 4, Line 42, CLAIM 1, Cancel "lease" and substitute therefor ---base---; Col. 4, Line 57, CLAIM 1, Cancel "housing" and substitute therefor ---housings---; Col. 4,5, lines 67,1, CLAIM 2, Cancel "said gear means comprises a gear journaled about the projecting end of said first shaft and having" and substitute therefor ---one of said first gears has---, Col. 5, line 2, CLAIM 2, After "said" insert ---one---; Col. 5, Line 3, CLAIM 2, After "said" insert ---one---; Col. 5, Line 3, CLAIM 2, Cancel "said first shaft" and substitute therefor ---the shaft of said one gear---; Col. 5, Line 5, CLAIM 2, Cancel "first".

Signed and Sealed this

*Seventh* Day of *January 1986*

[SEAL]

*Attest:*

DONALD J. QUIGG

*Attesting Officer* *Commissioner of Patents and Trademarks*